Sept. 2, 1969  B. H. BIELER ET AL  3,464,550

CONTINUOUS SOLID PARTICLE SHAPE CLASSIFIER

Filed May 4, 1967  2 Sheets-Sheet 1

INVENTORS.
Barrie H. Bieler
Robert P. Madison
BY
W. E. Higgins
ATTORNEY

INVENTORS.
Barrie H. Bieler
BY Robert P. Madison

W E Higgins
ATTORNEY

United States Patent Office 3,464,550
Patented Sept. 2, 1969

3,464,550
CONTINUOUS SOLID PARTICLE SHAPE
CLASSIFIER
Barrie H. Bieler, Walnut Creek, Calif., and Robert P. Madison, Beaverton, Mich., assignors to The Dow Chemical Company, Midland, Mich., a corporation of Delaware
Filed May 4, 1967, Ser. No. 636,190
Int. Cl. B07c 9/00; B07b 13/10
U.S. Cl. 209—112     8 Claims

ABSTRACT OF THE DISCLOSURE

An apparatus for separating a mixture of spherical and nonspherical particles on the basis of shape, the apparatus having an inclined plate with an unbroken surface and a means for vibrating the plate in the direction of its inclination, so that spherical particles roll downslope on the plate and nonspherical particles move upslope on the plate.

Field of the invention

This invention relates to an apparatus and process for separating particles solely on the basis of their shape. More particularly, it relates to an apparatus and process for separating a mixture of spherical particles and nonspherical particles of similar size and density on the basis of shape. As used herein, the terms "spherical" and "nonspherical" are used in their practical rather than geometric sense.

Description of the prior art

There are a number of devices in the mineral separation field which are used to separate particles based upon differences in density or upon differences in surface chemistry. Such devices cannot be used to classify materials of equal density and surface chemistry.

Devices for the separation of particles based on differences in size are also known. For example, Fasting, U.S. Patent 1,049,217, issued Dec. 31, 1912, discloses a device for separating particles based on differences in size comprising an inclined flat plate which is vibrated vertically in order to separate small particles from large particles.

Illustrative of prior art devices for separating particles of similar size and density based solely on differences in shape is that disclosed by Stutzman, U.S. Patent 2,658,616, issued Nov. 10, 1953. The Stutzman device has an inclined flat surface which is vibrated in a direction transverse to the inclination of the surface. Iron shot is fed at a point near the top and to one side of the surface. A distribution of the particles based on differences in shape is obtained, with substantially round particles rolling straight down the surface, while more angular particles move diagonally down and across the surface. It is difficult to use such a device to make a distinct separation betwen substantially spherical and nonspherical particles, however, because the angles of travel of the different shaped particles vary only by a relatively small amount.

Summary of the invention

It is an object of this invention to provide a means for the distinct separation of substantially spherical and nonspherical particles of similar size and density.

Another object of the invention is to provide a means for the distinct separation of essentially perfectly spherical particles from elliptical or semispherical or hemispherical particles of generally similar size and density.

Another object of this invention is to provide a means for the distinct separation of spherical particles having the same chemical composition as nonspherical particles of similar size based solely on the difference in shape.

Still another object of the invention is to provide a means for the distinct separation of water-sensitive spherical particles from nonspherical particles of similar size and density, based solely on the difference in shape.

A mixture of substantially spherical particles and nonspherical particles of similar size and density is separated according to this invention by feeding the mixture of particles to the surface of an inclined plate and subjecting the plate to a vibratory motion having a sufficient component in the direction of inclination of the plate to cause the nonspherical particles to move upward on the plate. In this way, substantially spherical particles roll down-slope on the plate and nonspherical particles move up-slope on the plate.

The apparatus for separating a mixture of substantially spherical particles and non-spherical particles of similar size and density of this invention comprises: (1) a plate enclosed at the sides, having an inclined, unbroken surface, and provided with discharge means at opposite ends of the inclined surface; and (2) means for imparting vibratory motion to the plate, the vibratory motion having a sufficient component in the direction of inclination of the plate to cause the nonspherical particles to move upwards on the plate. The inclination of the plate is sufficient to permit the substantially spherical particles to roll down the plate. This apparatus allows a distinct separation of substantially spherical particles from nonspherical particles of similar size and density.

Brief description of the drawing

The many advantages of the present invention will become apparent to those skilled in the art when the following more detailed description is read in connection with the accompanying drawing in which.

Figure 1:
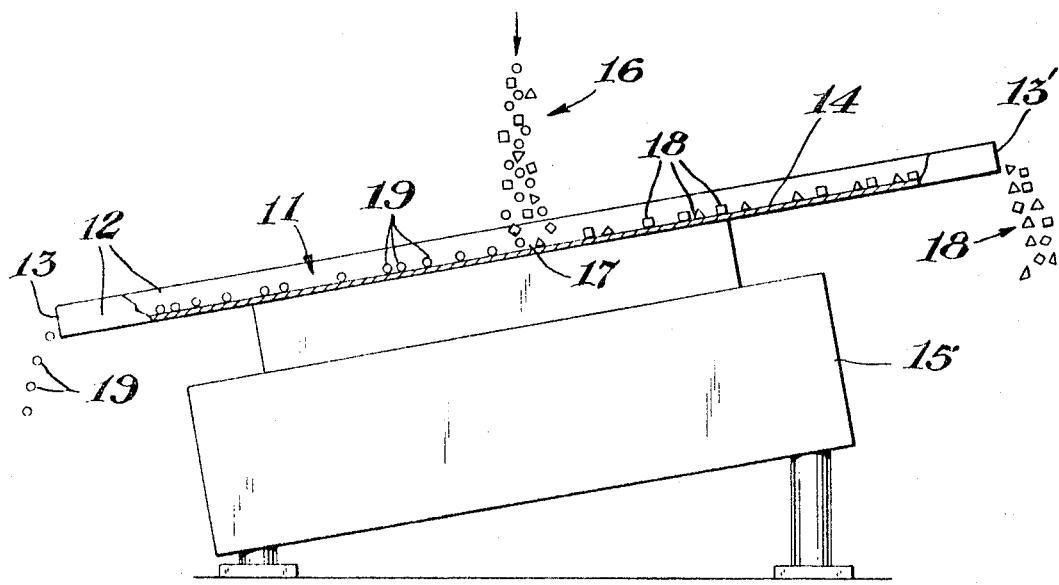
FIGURE 1 is a schematic diagram showing the essential features for an apparatus suitable for separating substantially spherical particles and nonspherical particles in accordance with the present invention.

The essential features of the apparatus of the present invention are shown in FIGURE 1. There is shown a plate 11 enclosed at the sides by walls 12 which are arranged to form discharge means at opposite ends of the plate. Thus, the plate 11 has discharge ports 13 and 13' at each end. As shown, the plate has an inclined, unbroken surface 14.

The plate 11 is operatively connected to a means for imparting vibratory motion to the plate, such as the vibrator 15. The vibrator may be actuated by a rotating eccentric weight or cam, the operation of alternating current on an electromagnet, or any of the other known means.

In operation, the mixture of substantially spherical and nonspherical particles 16 is fed to the vibrating plate 11, desirably at a point 17 near the center of the plate. The vibratory motion must have a sufficient component in the direction of inclination of the plate to cause the nonspherical particles 18 to move upward on the plate. This does not mean that the vibration cannot have a component perpendicular to the direction of inclination of the plate. Indeed, it is often desirable that the vibration has a component both in the direction of inclination of the plate and perpendicular to the upward direction of inclination of the plate, so that the particles are momentarily caused to leave the surface of the plate. The spherical particles 19, which have a lower coefficient of friction than the nonspherical particles 18, roll down the plate 11 in spite of the upward vibratory forces on all particles imparted by the vibrations of the plate 11. In this manner, a distinct separation of a mixture of nonspherical and spherical particles of similar size and density is accomplished. The substantially spherical particles roll down-slope on the plate, and the nonspherical particles move up-slope on the plate.

In the case of essentially completely spherical particles and nonspherical particles which differ only slightly from the spherical shape, the tilt angle of the plate 11 and the amplitude of the vibrations may be adjusted empirically to provide a distinct separation despite a very small difference in shape.

Description of the preferred embodiments

Figure 4:
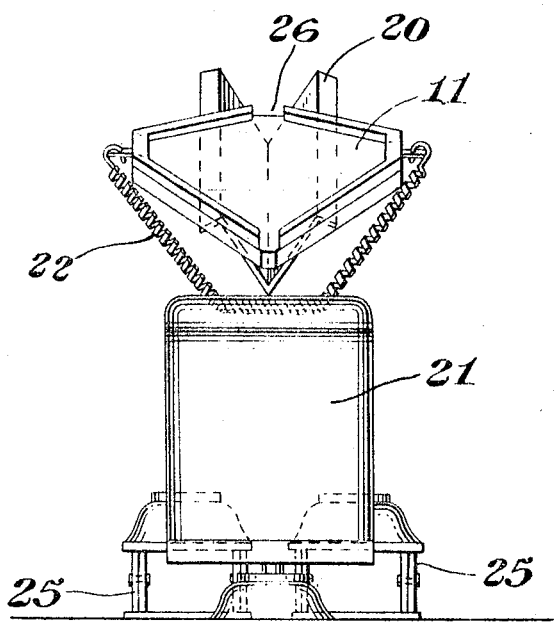
FIGURE 4 is an end view of the apparatus shown in FIGURES 2 and 3.
Figure 2:
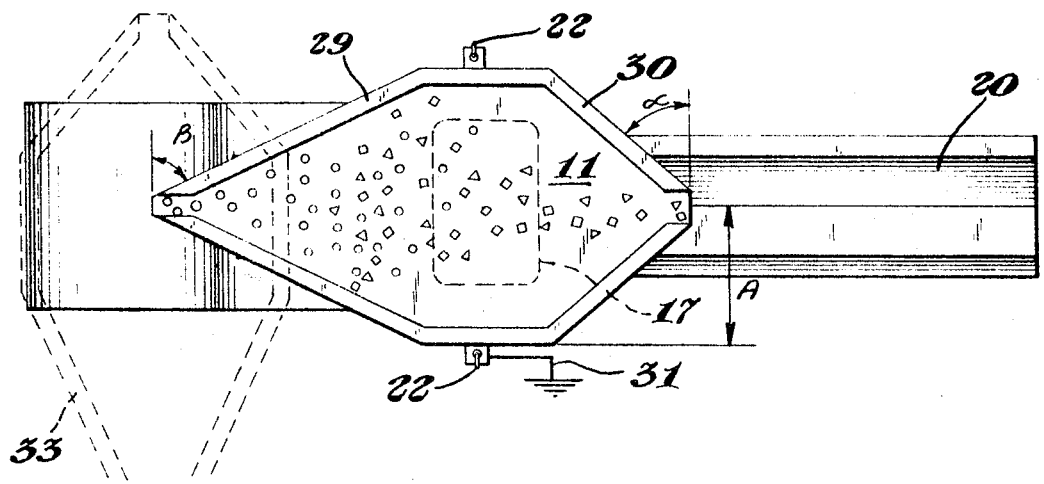
FIGURE 2 is a top view of a preferred embodiment of an apparatus for the continuous classification of solid particles in accordance with the invention.
Figure 3:
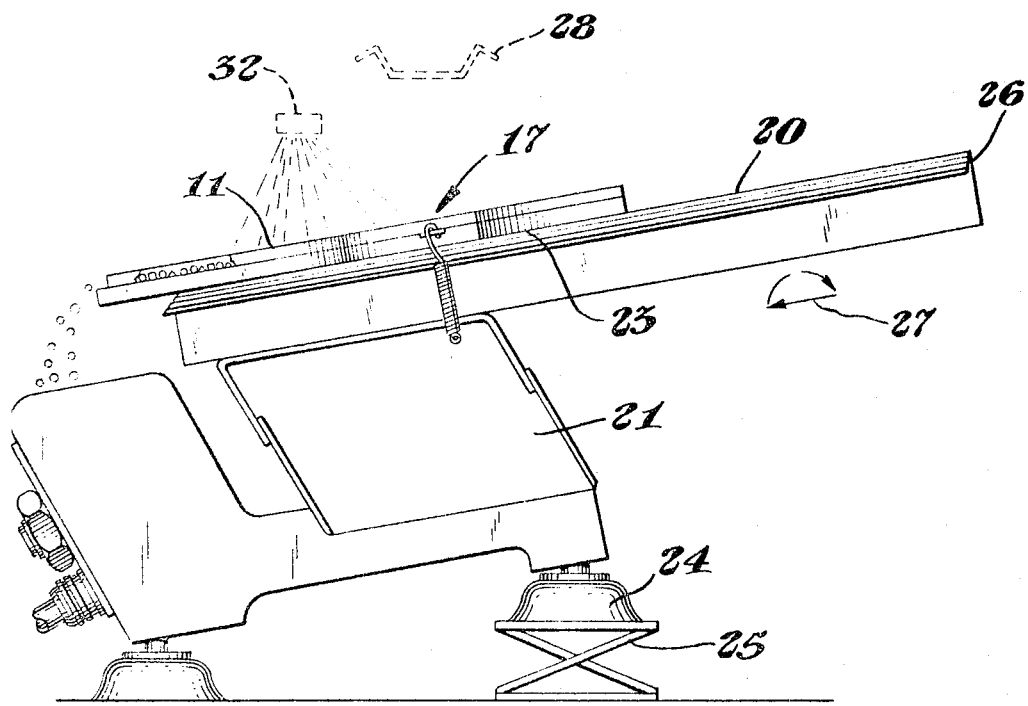
FIGURE 3 is a side view of the apparatus shown in FIGURE 2.

FIGURES 2, 3 and 4 illustrate a preferred embodiment of the invention. As shown the invention can be readily adapted to utilize a standard commercial vibratory feeder without destroying the feeder's utility when not in use to power the present invention. A plate having angled sidewall baffles is shown clamped to the trough 20 of the vibratory feeder 21, conveniently by means of a spring 22, although bolts may be used. If a spring is employed, an adhesive is preferably utilized at the points of contact 23, between the trough and the plate. The front legs 24 of the vibratory feeder 21 are mounted on an adjustable stage 25, which may be used to change the inclination of the plate 11. The vibratory feeder 21 is connected to a variable power source (not shown) which may be used to vary the amplitude of the vibrations.

The vibratory feeder 21 shown is the Vibra-Flow Feeder, Model S-TOB, obtained from the Syntron Co., Homer City, Pa. The 60-cycle vibrations of this particular model of vibratory feeder describe a roughly semicircular path as shown by the reference arrows 27. Any other standard vibratory feeder which will impart vibrations having a substantial component in the direction of inclination of the plate 11 may be used.

A means 28 for feeding the mixture 16 of spherical and nonspherical particles to the surface of the plate 11 is indicated in phantom in FIGURE 3. This is desirably another vibratory feeder such as used to impart vibratory motion to the plate. It is preferably arranged to feed the mixture of substantially spherical and nonspherical particles within a rectangular area 17 near the center of plate 11.

The plate 11 is desirably constructed of low density metal, such as aluminum or magnesium, of minimum inertia. For the separation of particles having diameters from about $\frac{1}{1000}$ of an inch to about $\frac{1}{8}$ inch, the top surface of the plate should be either buffed or metal plated to a high polish. In the case of larger particles, the surface of the plate may be slightly roughened, for example, by coating it with a layer of fine sand paper or rough cloth. For best results, the width of the plate should be at least 30 times the diameter of the largest particle to be separated.

The shape of the plate 11 is desirably such that the long dimension is three to five times that of the half-width A shown in FIGURE 2. The upslope angle $\alpha$ is desirably 45±20°, and the downslope angle $\beta$ is desirably 60±20°. The two parallel central sides are desirably approximately equal to the half-width A.

In practice, the apparatus of this invention is operated by adjusting the stage 25 so that the plate 11 is tilted upward at the outlet end 26 of the feed trough 20 such that an angle of from 5° to 20° from the horizontal is attained. Feed material is continuously dropped on the plate, desirably near the middle 17. At first a very low feed rate is used.

The vibratory feeder 21 is turned on and the amplitude of vibration is adjusted such that the spherical particles 19 roll down-slope on the plate and the nonspherical (i.e., angular to subrounded particles) 18 move up-slope, driven by the action of the vibratory feeder 21 below the plate 11. The substantially spherical particles 19, moving with about twice the velocity of the non-spherical particles 18, are converged by the acute angle side wall baffles 29 on the platform 11 and fall into a suitable product hopper or container (not shown).

The nonspherical particles 18 move slowly upward on the platform 11 and are guided by the obtuse angle side wall baffles 30 and fall through the opening to the trough 20 below. The nonspherical particles then move forward up the trough 20 to a suitable container (not shown).

The proper angle of tilt, amplitude of vibration, and rate of vibration of the plate depend on the characteristics of the material being separated. In general, if the material contains both a high percentage of nonspherical particles and the nonspherical particles are quite angular, a tilt angle close to 20° with a relatively high vibration amplitude is required. If a separation of subrounded from spherical particles is desired, a tilt angle close to 5° and a low vibration amplitude is best.

After the tilt angle and vibration amplitude are set for the particular material to be separated, the feed rate of material to the plate is increased to a rate just short of causing entrapment of spherical in angular particles or vice versa. If the apparatus is adjusted in this manner, the most efficient separation may be obtained.

When nonspherical particles which differ only slightly from essentially perfectly spherical particles are to be separated, the angle of tilt of the plate and the amplitude of the vibrations are empirically adjusted to carry the nonspherical particles (which in this instance may be considered imperfectly formed spheres) up the plate and to allow the more perfectly formed spheres to roll down the plate. The angle of tilt and the amplitude of vibration used will depend on how perfectly spherical to the desired particles must be. Generally, tilt angles of less than 5° with a low vibration amplitude are used for this purpose.

Depending on the nature of the material to be separated according to the present invention, the build-up of static electrical charges on the plates may be a problem. This may be alleviated by grounding the plate, for example, with a ground wire 31. If static electricity still remains a problem (particularly with nonconducting materials less than $\frac{1}{32}$ of inch in diameter) an alpha particle emitting source 32 near the plate (desirably placed from ¾ to 1½ inches above the surface of the plate) to deionize the small grains on the platform will help to prevent agglomeration.

Examples of materials which may be separated into spherical and nonspherical portions by using the apparatus of this invention include iron shot; glass beads; fused aluminum oxide ($Al_2O_3$), cerium oxide ($CeO_2$), or uranium oxide ($UO_2$) particles, water sensitive particles, such as magnesium oxide or calcium oxide particles; latex spheres; ion exchange resin beads; and the like. Essentially any solid material may be separated using the apparatus of this invention, so long as the material is made up of a mixture of substantially spherical and nonspherical particles.

Tests on a fused aluminum oxide feed consisting of about 50 to 90% substantially spherical particles yielded a product containing 99% spherical particles with over 75% of the original spherical particles in the product thus separated. A rerun of the 99% substantially spherical particles with a lower tilt angle and a lower vibration amplitude gave a product containing 99.9% substantially spherical particles. It is thus apparent that two or more inclined plates in accordance with the invention can be arranged so that the product feed from one plate drops to another plate for further separation. Such placement of a second plate is shown (in phantom) in FIGURE 2.

Remote control means for the tilt angle of the plate, the amplitude of the vibrations, and the feed rate of particle mixture to the plate may be used. The capability to vary these parameters remotely makes this device useful in the explosives and nuclear fields.

From the foregoing description, it should be apparent to those skilled in the art that the present invention provides a process and apparatus capable of accomplishing the stated objects. Thus, the separation of materials into substantially spherical and nonspherical portions is readily accomplished, based solely upon the difference in shape. The method is suitable for materials having the same chemical composition, and also for materials which would be sensitive to chemical change with other methods of separation, particularly methods employing water. The method is further suitable for separating imperfectly formed spheres from more perfectly formed spheres, even where the difference between them is slight.

It should be further apparent to those skilled in the art that various modifications and obvious mechanical equivalents may be made or substituted in the invention as described above without departing from the spirit thereof.

What is claimed is:

1. An apparatus for separating a mixture of substantially spherical particles and nonspherical particles which comprises:
    (1) a plate enclosed at the sides, having an inclined, unbroken surface and provided with discharge means at opposite ends of the inclined surface; and
    (2) means for imparting vibratory motion to the plate, the vibratory motion having a sufficient component in the direction of inclination of the plate to cause the nonspherical particles to move upwards on the plate, and the inclination of the plate being sufficient to permit the substantially spherical particles to roll down on the plate; and
    (3) a means for removing static electricity from the particles to be separated and from the plate.

2. The apparatus of claim 1 wherein the vibratory motion of the plate is substantially in the direction of inclination of the plate.

3. The apparatus of claim 1 wherein the vibratory motion of the plate describes a substantially semicircular path, as shown by the reference arrows (27) in FIGURE 3.

4. The apparatus of claim 1 wherein the long dimension of the plate is three to five times the half width of the plate, wherein the upslope angle $\alpha$ of the plate, as shown in FIGURE 2, is from 25 to 65 degrees, and the downslope angle $\beta$ of the plate, as shown in FIGURE 2, is from 40 to 80 degrees.

5. The apparatus of claim 1 wherein the means for removing the static electricity formed is a ground connection affixed to the plate.

6. The apparatus of claim 1 wherein the means for removing the static electricity is an alpha particle emitting source.

7. A process for separating a mixture of substantially spherical particles and nonspherical particles of similar size and density, which comprises feeding the mixture to the surface of a plate inclined a sufficient amount to allow the spherical particles to roll down the plate, subjecting the plate to a vibratory motion having a sufficient component in the direction of inclination of the plate to cause the nonspherical particles to move upward on the plate and removing the static electricity formed on the particles and on the plate.

8. A process for separating a mixture of imperfectly formed spherical particles and more perfectly formed spherical particles which comprises feeding the mixture to the surface of a plate which is capable of being inclined and vibrated with a component of vibration in the direction of inclination of the plate, empirically adjusting the angle of inclination and amplitude of vibration of the plate to carry the imperfectly formed spherical particles up the plate and allow the more perfectly formed spherical particles to roll down the plate and removing the static electricity from the particles and the plate.

References Cited

UNITED STATES PATENTS

| 1,368,746 | 2/1921 | Palmer et al. | 209—112 |
| 3,044,621 | 7/1962 | Pearlman et al. | 209—112 |

OTHER REFERENCES

R.I. 4286; Krug, J. A., Boyd, J.; "Report of Investigations, New Dry Concentrating Equipment," May 1948.

ALLEN N. KNOWLES, Primary Examiner

U.S. Cl. X.R.

209—116